(12) United States Patent
Muroya et al.

(10) Patent No.: US 11,424,517 B2
(45) Date of Patent: Aug. 23, 2022

(54) SECONDARY CELL AND BATTERY PACK

(71) Applicant: SANYO Electric Co., Ltd., Daito (JP)

(72) Inventors: Yohei Muroya, Hyogo (JP); Hiroshi Takabayashi, Hyogo (JP)

(73) Assignee: SANYO Electric Co., Ltd., Daito (JP)

( * ) Notice: Subject to any disclaimer, the term of this patent is extended or adjusted under 35 U.S.C. 154(b) by 177 days.

(21) Appl. No.: 16/705,447

(22) Filed: Dec. 6, 2019

(65) Prior Publication Data
US 2020/0212415 A1    Jul. 2, 2020

(30) Foreign Application Priority Data

Dec. 27, 2018  (JP) .............................. JP2018-244433

(51) Int. Cl.
| | |
|---|---|
| *H01M 50/543* | (2021.01) |
| *H01M 50/20* | (2021.01) |
| *H01M 50/502* | (2021.01) |
| *H01M 50/528* | (2021.01) |

(52) U.S. Cl.
CPC ......... *H01M 50/543* (2021.01); *H01M 50/20* (2021.01); *H01M 50/502* (2021.01); *H01M 50/528* (2021.01); *H01M 2220/20* (2013.01)

(58) Field of Classification Search
CPC .. H01M 50/543; H01M 50/20; H01M 50/502; H01M 50/528; H01M 2220/20; H01M 50/531; H01M 50/172; H01M 10/0525; Y02E 60/10
See application file for complete search history.

(56) References Cited

U.S. PATENT DOCUMENTS

| | | |
|---|---|---|
| 2013/0196221 A1 | 8/2013 | Hattori et al. |
| 2014/0212741 A1* | 7/2014 | Kim .................... H01M 50/543 |
| | | 429/179 |
| 2014/0242440 A1* | 8/2014 | Yamada ............. H01M 50/172 |
| | | 429/121 |
| 2016/0118641 A1 | 4/2016 | Oda et al. |
| 2017/0054131 A1 | 2/2017 | Yokota et al. |
| 2021/0203040 A1 | 7/2021 | Okada et al. |

FOREIGN PATENT DOCUMENTS

| | | |
|---|---|---|
| JP | 2013-157130 A | 8/2013 |
| JP | 2016-85961 A | 5/2016 |
| JP | 6014808 B1 | 10/2016 |
| JP | 2016-192322 A | 11/2016 |
| WO | 2017/130705 A1 | 8/2017 |

* cited by examiner

*Primary Examiner* — Ula C Ruddock
*Assistant Examiner* — Sarika Gupta
(74) *Attorney, Agent, or Firm* — WHDA, LLP (57) ABSTRACT

A negative electrode terminal includes a flange, and a connection portion disposed on a first surface of the flange. The connection portion is inserted into a terminal attachment hole. The negative electrode terminal includes a first area made of aluminium or an aluminium alloy, and a second area made of copper or a copper alloy. In the flange, the second area is disposed adjacent to the first surface, and the first area is disposed adjacent to the second surface. A boundary between the first area and the second area is disposed between the first surface and the second surface. A thinnest portion of the first area of the flange in the thickness direction of the flange has a thickness of larger than or equal to 0.3 mm. An external electroconductive member made of aluminium or an aluminium alloy is welded to the flange to form a welded portion.

8 Claims, 6 Drawing Sheets

SECONDARY CELL AND BATTERY PACK

CROSS REFERENCE TO RELATED APPLICATIONS

The present invention application claims priority to Japanese Patent Application No. 2018-244433 filed in the Japan Patent Office on Dec. 27, 2018, the entire contents of which are incorporated herein by reference.

BACKGROUND OF THE INVENTION

Field of the Invention

The present invention relates to a secondary cell and a battery pack.

Description of Related Art

Secondary cells such as lithium ion secondary cells are used as, for example, power sources for driving a hybrid electric vehicle (PHEV or HEV) or an electric vehicle (EV). A battery pack formed by connecting multiple secondary cells in series or in parallel is used in a driving power source. Secondary cells adjacent to each other in a battery pack are electrically connected to each other by a bus bar.

A secondary cell generally includes an aluminium-based metal for use as a positive electrode core and a positive electrode collector, and a copper-based metal for use as a negative electrode core and a negative electrode collector.

An aluminium-based metal is used as a material for a positive-electrode external electroconductive member welded to a positive electrode terminal, and a copper-based metal is used as a material for a negative-electrode external electroconductive member welded to a negative electrode terminal (refer to Japanese Published Unexamined Patent Application No. 2013-157130 (Patent Document 1))

BRIEF SUMMARY OF THE INVENTION

The present invention aims to provide a secondary cell that includes a highly reliable connection portion that connects a terminal of the secondary cell and an external electroconductive member together, and a battery pack including the secondary cell.

A secondary cell according to an aspect of the present invention includes an electrode assembly that includes a positive electrode plate and a negative electrode plate; an outer covering that has an opening and accommodates the electrode assembly; a sealing plate that covers the opening; and a terminal electrically connected to the positive electrode plate or the negative electrode plate. The sealing plate has a terminal attachment hole. The terminal includes a flange that has a first surface and a second surface opposite to the first surface, and a connection portion on the first surface. The connection portion is inserted into the terminal attachment hole. The terminal includes a first area made of aluminium or an aluminium alloy, and a second area made of copper or a copper alloy. The second area is disposed on the first surface of the flange, and the first area is disposed on the second surface of the flange. At least part of a boundary between the first area and the second area is disposed between the first surface and the second surface. In the flange, a thinnest portion of the first area in a thickness direction of the flange has a thickness of larger than or equal to 0.3 mm. An external electroconductive member made of aluminium or an aluminium alloy is disposed on the flange. The external electroconductive member is welded to the flange to form a welded portion.

A battery pack according to an aspect of the present invention includes a plurality of the secondary cells. In a battery pack according to an aspect of the present invention, a plurality of the secondary cells are connected in series or in parallel to each other.

An aspect of the present invention is a secondary cell including a highly reliable connection portion that connects a terminal and an external electroconductive member, and a battery pack including the secondary cell.

DETAILED DESCRIPTION OF THE INVENTION

Embodiments of the present invention will be described in detail, below. However, the present invention is not limited to the following embodiments.

Firstly, a structure of a rectangular secondary cell 50 according to an embodiment will be described with reference to FIG. 1 to FIG. 4. The secondary cell 50 includes a rectangular hollow closed-end outer covering 1 having an opening, and a sealing plate 2, which covers the opening of the outer covering 1. The outer covering 1 and the sealing plate 2 constitute a battery casing 200. Preferably, the outer covering 1 and the sealing plate 2 are made of metal, or more preferably, aluminium or an aluminium alloy.

Figure 2:
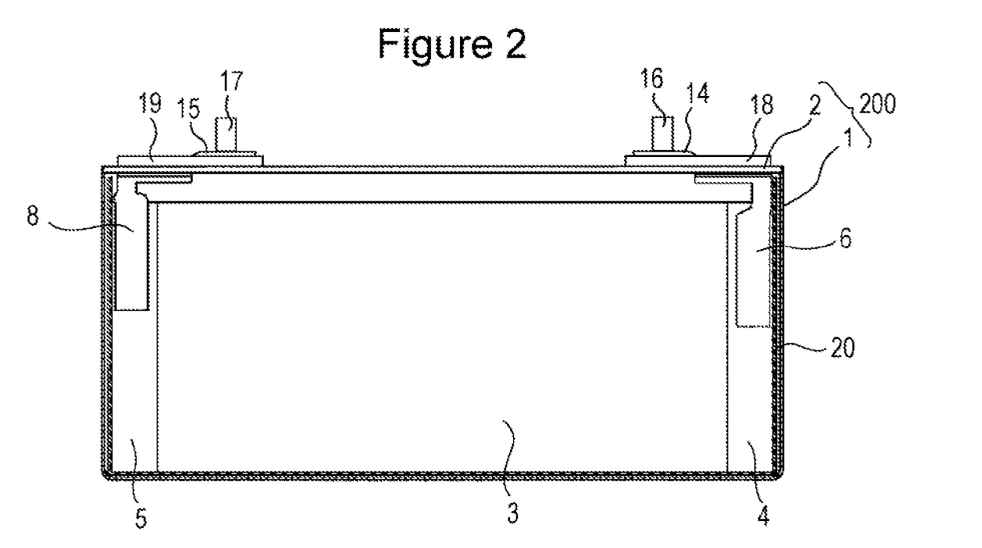
FIG. 2 is a front view of a secondary cell according to an embodiment, and from which a side wall of an outer covering and an insulating sheet are removed.

The outer covering 1 accommodates a flat wound electrode assembly 3, including a belt-shaped positive electrode plate and a belt-shaped negative electrode plate wound with a belt-shaped separator interposed therebetween, and a non-aqueous electrolyte solution. The wound electrode assembly 3 includes a positive electrode core outcrop 4, wound at a first end portion, and a negative electrode core outcrop 5, wound at a second end portion. An insulating sheet 20 made of resin is disposed between the wound electrode assembly 3 and the outer covering 1.

Figure 3:
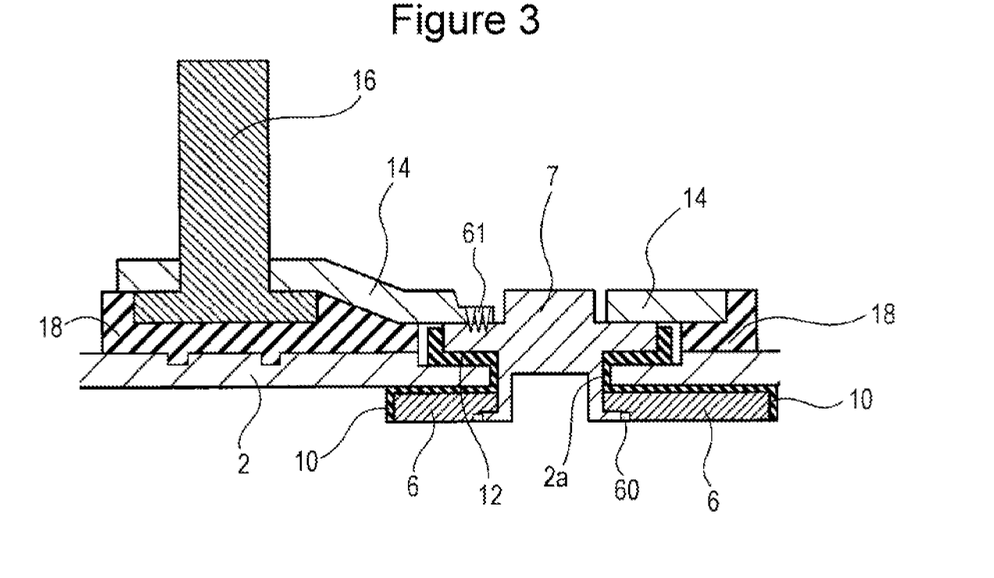
FIG. 3 is a cross-sectional view of a portion of the secondary cell near a positive electrode terminal taken in a longitudinal direction of a sealing plate.

A positive electrode collector 6 is connected to the positive electrode core outcrop 4, and the positive electrode collector 6 and a positive electrode terminal 7 are electrically connected to each other. An internal insulator 10 is disposed between the positive electrode collector 6 and the sealing plate 2, and an external insulator 12 is disposed between the positive electrode terminal 7 and the sealing plate 2. An external electroconductive member 14 is connected to the positive electrode terminal 7 outside the battery casing 200. A bolt 16 is disposed on the external electroconductive member 14. An insulator 18 is disposed between the external electroconductive member 14 and the sealing plate 2.

Figure 4:
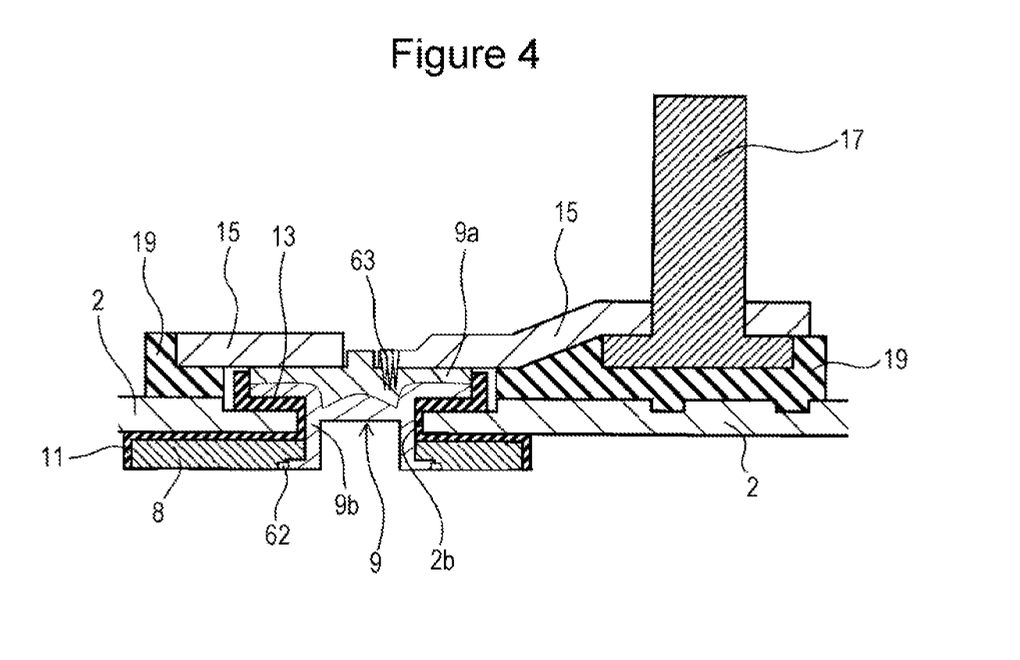
FIG. 4 is a cross-sectional view of a portion of the secondary cell near a negative electrode terminal taken in the longitudinal direction of the sealing plate.

A negative electrode collector 8 is connected to the negative electrode core outcrop 5, and the negative electrode collector 8 and a negative electrode terminal 9 are electrically connected to each other. An internal insulator 11 is disposed between the negative electrode collector 8 and the sealing plate 2, and an external insulator 13 is disposed between the negative electrode terminal 9 and the sealing plate 2. An external electroconductive member 15 is connected to the negative electrode terminal 9 outside the battery casing 200. A bolt 17 is disposed on the external electroconductive member 15. An insulator 19 is disposed between the external electroconductive member 15 and the sealing plate 2.

Figure 1:
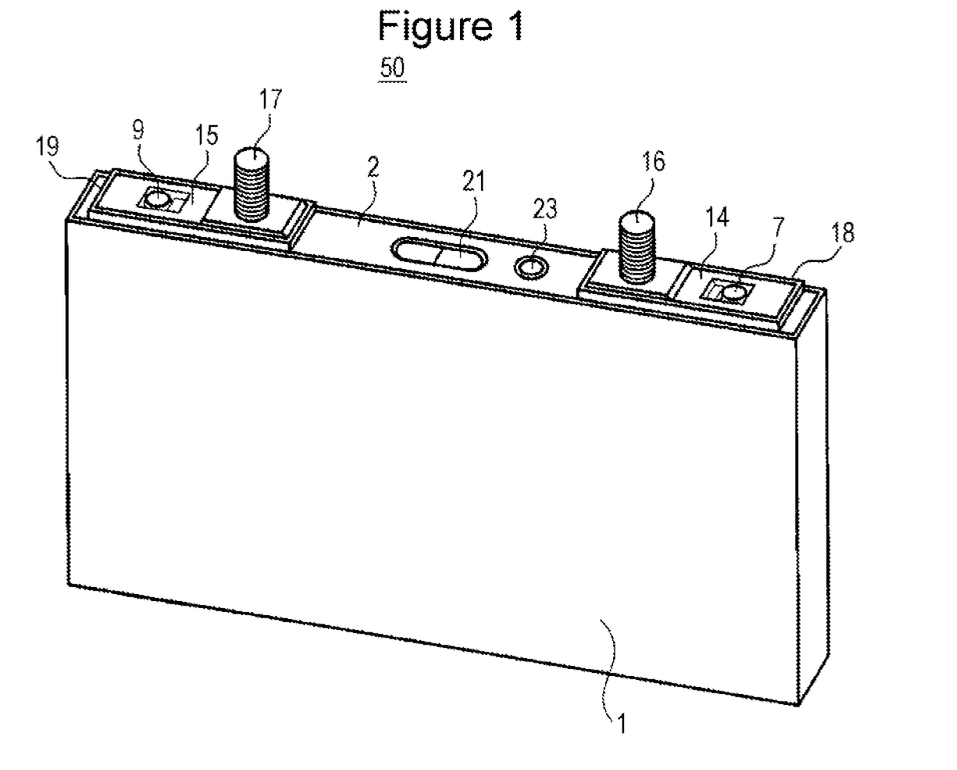
FIG. 1 is a perspective view of a secondary cell according to an embodiment.

A gas exhaust valve 21 is disposed on the sealing plate 2. The gas exhaust valve 21 breaks when the pressure inside the battery casing 200 reaches or exceeds a predetermined value to let gas in the battery casing 200 out of the battery casing 200. The sealing plate 2 has a battery filler inlet. The battery filler inlet is covered by a sealing member 23 after the battery casing 200 is filled with the nonaqueous electrolyte solution.

Thereafter, the structure of the secondary cell 50 will be described in detail.

Positive Electrode Plate

Preferably, the positive electrode plate includes positive electrode active material layers on both sides of metal foil serving as a positive electrode core. Examples preferably usable as a positive electrode core is aluminium foil or aluminium alloy foil. Preferably, a positive electrode active material is a lithium transition metal oxide that can occlude and release lithium ions. Preferably, the positive electrode active material layer contains a positive electrode active material, an electroconductive material such as a carbon material, and a binder.

Negative Electrode Plate

Preferably, the negative electrode plate includes negative electrode active material layers on both sides of metal foil serving as a negative electrode core. Examples preferably usable as a negative electrode core is copper foil or copper alloy foil. Preferably, a negative electrode active material is a carbon material such as graphite, or a silicon material. The negative electrode active material layer preferably contains a negative electrode active material and a binder. An electroconductive material may be added to the negative electrode active material layer as needed.

Electrode Assembly

A belt-shaped positive electrode plate having the positive electrode core outcrop 4 at a first end in the widthwise direction and a belt-shaped negative electrode plate having the negative electrode core outcrop 5 at a second end in the widthwise direction are wound with a belt-shaped separator interposed therebetween, so that the flat wound electrode assembly 3 can be formed. The electrode assembly may be a multilayer electrode assembly including multiple positive electrode plates and multiple negative electrode plates.

Nonaqueous Electrolyte

An example usable as the nonaqueous electrolyte is a nonaqueous electrolyte solution, formed by dissolving an electrolyte in a nonaqueous solvent. Materials widely known are usable as the nonaqueous solvent and the electrolyte. The nonaqueous electrolyte may be in either the solid state or the gel state.

Positive Electrode Conductive Path

FIG. 3 is a cross-sectional view of a portion of the secondary cell 50 near the positive electrode terminal 7 taken in the longitudinal direction of the sealing plate 2. Around a positive electrode terminal attachment hole 2a of the sealing plate 2, the internal insulator 10 made of resin and the positive electrode collector 6 are disposed on the inner surface. Around the positive electrode terminal attachment hole 2a of the sealing plate 2, the external insulator 12 made of resin is disposed on the outer surface. The positive electrode terminal 7 is inserted into the external insulator 12, the positive electrode terminal attachment hole 2a of the sealing plate 2, the through-hole of the internal insulator 10, and the through-hole of the positive electrode collector 6, and the tip end of the positive electrode terminal 7 is caulked on the positive electrode collector 6. Thus, the positive electrode collector 6 and the positive electrode terminal 7 are fixed to the sealing plate 2. Preferably, the caulked portion of the positive electrode terminal 7 is welded to the positive electrode collector 6 to form a welded portion 60.

The external electroconductive member 14 is welded to the positive electrode terminal 7 to form a welded portion 61. The bolt 16 is disposed on the external electroconductive member 14. The bolt 16 is used to fix a bus bar that electrically connects the external electroconductive member 14 and an external electroconductive member of another secondary cell 50 to each other. The insulator 18 made of resin is disposed between the external electroconductive member 14 and the sealing plate 2.

The positive electrode collector 6, the positive electrode terminal 7, and the external electroconductive member 14 are made of metal, preferably, aluminium or an aluminium alloy. The bolt 16 is preferably made of metal. The positive electrode collector 6, the positive electrode terminal 7, and the external electroconductive member 14 are electrically insulated from the sealing plate 2.

Negative Electrode Conductive Path

FIG. 4 is a cross-sectional view of a portion near the negative electrode terminal 9 taken in the longitudinal direction of the sealing plate 2. The internal insulator 11 made of resin and the negative electrode collector 8 are disposed on the inner surface of the sealing plate 2 around a negative electrode terminal attachment hole 2b of the sealing plate 2. The external insulator 13 made of resin is disposed on the outer surface of the sealing plate 2 around the negative electrode terminal attachment hole 2b of the sealing plate 2. The negative electrode terminal 9 is inserted into the external insulator 13, the negative electrode terminal attachment hole 2b of the sealing plate 2, the through-hole of the internal insulator 11, and the through-hole of the negative electrode collector 8, and the tip end of the negative electrode terminal 9 is caulked on the negative electrode collector 8. Thus, the negative electrode collector 8 and the negative electrode terminal 9 are fixed to the sealing plate 2. Preferably, the caulked portion of the negative electrode terminal 9 is welded to the negative electrode collector 8 to form a welded portion 62.

The external electroconductive member 15 is welded to the negative electrode terminal 9 to form a welded portion 63. The bolt 17 is disposed on the external electroconductive member 15. The bolt 17 is used to fix a bus bar that electrically connects the external electroconductive member 15 and an external electroconductive member of another secondary cell 50 to each other. The insulator 19 made of resin is disposed between the external electroconductive member 15 and the sealing plate 2.

Preferably, the negative electrode collector 8 is made of copper or a copper alloy. Preferably, the external electroconductive member 15 is made of aluminium or an aluminium alloy. The external electroconductive member 15 made of aluminium or an aluminium alloy enables weight reduction of the secondary cell 50 and a battery pack including the secondary cell 50. Connection between the external electroconductive member 15 and the bus bar made of aluminium or an aluminium alloy enables connection of the same metal. Thus, the connection portion between the external electroconductive member 15 and the bus bar has high reliability.

Figure 5:
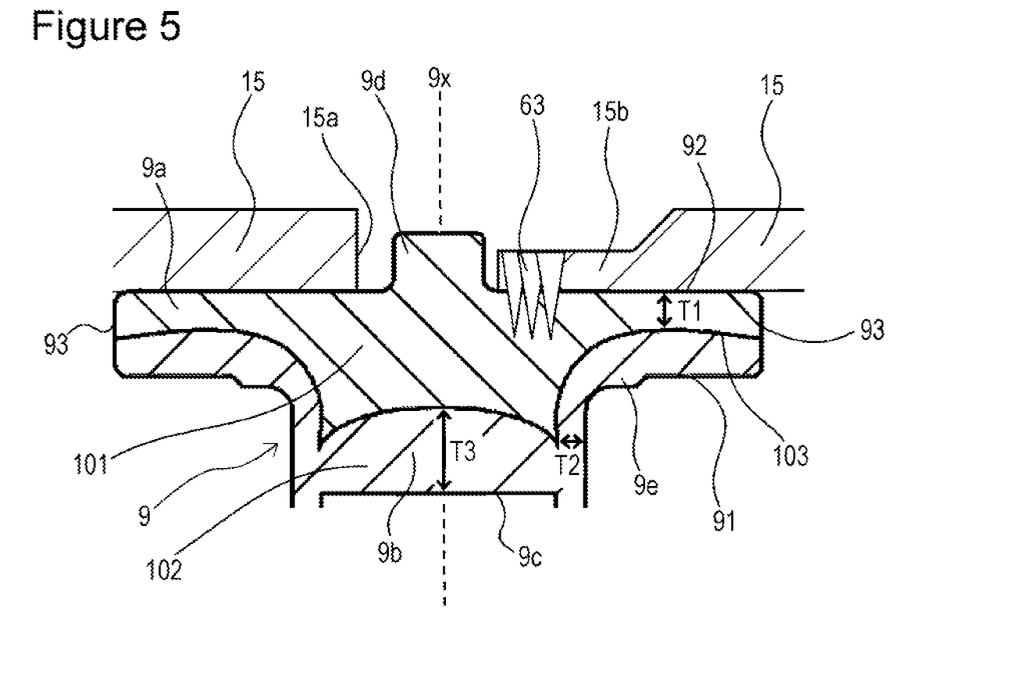
FIG. 5 is an enlarged view of a portion near a welded portion between the negative electrode terminal illustrated in FIG. 4 and an external electroconductive member.

As illustrated in FIG. 4 and FIG. 5, the negative electrode terminal 9 includes a flange 9*a*. The flange 9*a* includes a first surface 91, a second surface 92 disposed opposite to the first surface 91, and a side surface 93 that connects the first surface 91 and the second surface 92 to each other. A connection portion 9*b* is disposed on the first surface 91 of the flange 9*a*. The flange 9*a* has an outer diameter that is larger than the inner diameter of the negative electrode terminal attachment hole 2*b* of the sealing plate 2. The outer diameter of the flange 9*a* is larger than the outer diameter of the connection portion 9*b*. The connection portion 9*b* is inserted into the negative electrode terminal attachment hole 2*b* of the sealing plate 2. The tip end of the connection portion 9*b* is caulked on the negative electrode collector 8. The connection portion 9*b* has a recess 9*c*. A protrusion 9*d* is disposed on the second surface 92 of the flange 9*a*. The protrusion 9*d* may be omitted.

The external electroconductive member 15 made of aluminium or an aluminium alloy is disposed on the flange 9*a*. The external electroconductive member 15 and the flange 9*a* are welded to form a welded portion 63. The external electroconductive member 15 has a thin portion 15*b*, and the thin portion 15*b* is welded to the flange 9*a*. The external electroconductive member 15 has a through-hole 15*a*. The protrusion 9*d* of the negative electrode terminal 9 is disposed in the through-hole 15*a*. The thin portion 15*b* is disposed adjacent to the edge of the through-hole 15*a*.

The negative electrode terminal 9 includes a first area 101 made of aluminium or an aluminium alloy and a second area 102 made of copper or a copper alloy. The first area 101 is located on the second surface 92, and the second area 102 is located on the first surface 91. A boundary 103 between the first area 101 and the second area 102 extends toward the center of the flange 9*a* from the side surface 93 of the flange 9*a*. In the center portion of the negative electrode terminal 9 (a portion adjacent to a center axis 9*x* of the negative electrode terminal 9), the boundary 103 is located closer to the tip end of the connection portion 9*b* (closer to a lower portion in FIG. 5) than the first surface 91 of the flange 9*a*.

The boundary 103 defines an area in which the first area 101 is gradually thinned from the side surface 93 of the flange 9*a* toward the center axis 9*x* of the negative electrode terminal 9, and an area in which the first area 101 is gradually thickened toward the center axis 9*x* of the negative electrode terminal 9. At the connection portion 9*b*, the boundary 103 has a protruding shape that protrudes toward the second surface 92 at the center portion. The portion having a protruding shape is a convex protrusion.

The flange 9*a* has a thick portion 9*e*, which has a thickness larger than the thickness of the outer peripheral portion, at the base portion of the connection portion 9*b*. The thick portion 9*e* partially protrudes from the first surface 91 toward the sealing plate 2. The thick portion 9*e* can improve the electroconductivity of the negative electrode terminal 9. Thus, the secondary cell has more highly efficient output characteristics. In addition, heating of the negative electrode terminal 9 can be prevented, and thus degradation of the external insulator 13 can be prevented.

The external electroconductive member 15 made of aluminium or an aluminium alloy is connected to the first area 101 of the negative electrode terminal 9 made of aluminium or an aluminium alloy. The negative electrode collector 8 made of copper or a copper alloy is connected to the second area 102 of the negative electrode terminal 9 made of copper or a copper alloy. Thus, the external electroconductive member 15 and the negative electrode terminal 9, made of the same type of metal, are connected together, and the negative electrode collector 8 and the negative electrode terminal 9, made of the same type of metal, are connected together. Thus, the connection portion between the external electroconductive member 15 and the negative electrode terminal 9, and the connection portion between the negative electrode collector 8 and the negative electrode terminal 9 are firm, and highly reliable.

Here, if the welded portion 63 formed between the external electroconductive member 15 and the first area 101 of the negative electrode terminal 9 extends to the second area 102 of the negative electrode terminal 9, connection is established between different types of metal, that is, between an aluminium-based metal and a copper-based metal. This connection may degrade the joining strength between the external electroconductive member 15 and the negative electrode terminal 9 and the joining strength between the first area 101 and the second area 102. Thus, the welded portion 63 preferably avoids extending to the second area 102 of the negative electrode terminal 9.

In order to secure the joining strength between the external electroconductive member 15 and the first area 101 of the negative electrode terminal 9 and to prevent the welded portion 63 from extending to the second area 102 of the negative electrode terminal 9, preferably, the thinnest portion of the first area 101 in the flange 9*a* has a thickness T1 of larger than or equal to 0.3 mm. This structure can secure the joining strength between the external electroconductive member 15 and the negative electrode terminal 9, and prevent the welded portion 63 from extending to the second area 102 of the negative electrode terminal 9 even when the position of the welded portion 63 formed in the first area 101 of the negative electrode terminal 9 is shifted.

In the flange 9*a*, the welded portion 63 is preferably formed in an area closer to the center axis 9*x* of the negative electrode terminal 9 than the portion of the first area 101 having the smallest thickness. This structure can effectively prevent the welded portion 63 from extending to the second area 102 of the negative electrode terminal 9.

In the flange 9*a*, preferably, the thinnest portion of the first area 101 has a thickness T1 of larger than or equal to 0.5 mm.

The external electroconductive member 15 having the through-hole 15*a* allows checking that no gap is formed between the external electroconductive member 15 and the flange 9*a* of the negative electrode terminal 9 when the external electroconductive member 15 and the negative electrode terminal 9 are connected together by welding, so that the welded portion 63 can be stably formed. This structure can securely prevent the welded portion 63 from extending to the second area 102 of the negative electrode terminal 9.

In addition, the welded portion 63 formed in the thin portion 15b of the external electroconductive member 15 can be securely prevented from extending to the second area 102 of the negative electrode terminal 9. Preferably, the thickness of the thin portion 15b is smaller than the height of the protrusion 9d.

The thickness of the external electroconductive member 15 (thickness around the thin portion 15b) is preferably larger than the height of the protrusion 9d. This structure can prevent the welded portion 63 from being damaged by, for example, coming into contact with other components.

In the connection portion 9b, the thinnest portion of the second area 102 in the radial direction (lateral direction in FIG. 5) preferably has a thickness T2 of larger than or equal to 0.1 mm. This structure can securely prevent the first area 101 from being exposed from the connection portion 9b. The first area 101 exposed from the connection portion 9b may be corroded by a nonaqueous electrolyte.

In the connection portion 9b, the thinnest portion of the second area 102 in the radial direction preferably has a thickness T2 of smaller than or equal to 0.5 mm. Thus, the proportion of the first area 101 in the connection portion 9b can be increased, and this structure can effectively prevent the welded portion 63 from extending to the second area 102.

At the center portion of the connection portion 9b of the negative electrode terminal 9, preferably, the thickness T3 of the second area 102 in the direction in which the center axis 9x extends is preferably larger than or equal to 0.6 mm. The negative electrode terminal 9 can thus improve the electroconductivity. Thus, a secondary cell has efficient output characteristics. This structure can also reduce heating of the negative electrode terminal 9, and thus can prevent degradation of the external insulator 13.

Figure 6:
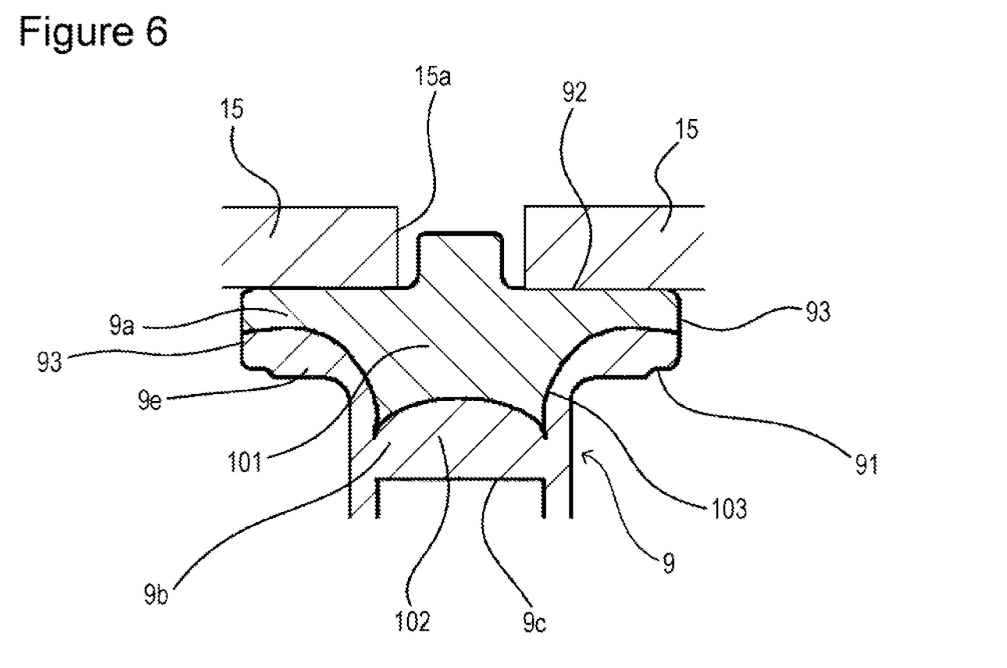
FIG. 6 is a cross-sectional view of a portion near the negative electrode terminal taken in a lateral direction of the sealing plate.

FIG. 6 is a cross-sectional view of a portion near the negative electrode terminal 9 taken along the lateral direction of the sealing plate 2. FIG. 6 illustrates the negative electrode terminal 9 and the external electroconductive member 15, only.

Figure 7:
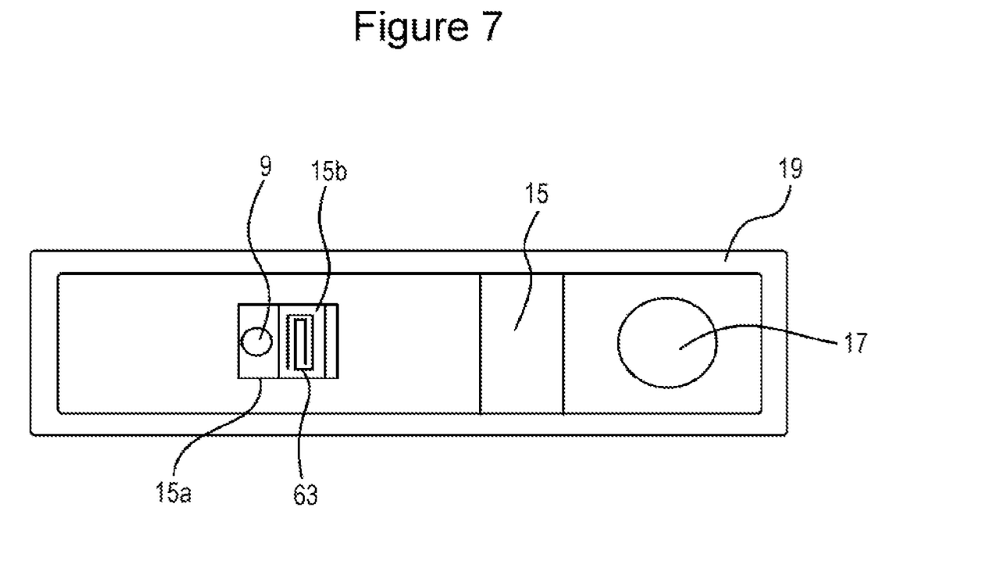
FIG. 7 is a plan view of a portion near the negative electrode terminal and the external electroconductive member.

FIG. 7 is a plan view of the portion near the negative electrode terminal 9 and the external electroconductive member 15. Preferably, multiple welded portions 63 are formed in a row in the radial direction from the center axis 9x of the negative electrode terminal 9. The welded portion 63 may have a coiled shape. The position of the welded portion 63 in the longitudinal direction of the sealing plate 2 is preferably shifted from the center axis 9x of the negative electrode terminal 9 toward the center portion of the sealing plate 2 (toward the gas exhaust valve 21). Thus, a secondary cell having low resistance can be obtained.

A nickel layer made of nickel may be disposed on the surface of the second area 102.

Preferably, the boundary 103 on the side surface of the flange 9a is covered with the external insulator 13. In this structure, when water forms near the negative electrode terminal 9 due to condensation or other causes, an area extending over the first area 101 made of aluminium or an aluminium alloy and the second area 102 made of copper or a copper alloy can be kept away from waterdrops or a water screen. Thus, the first area 101 made of aluminium or an aluminium alloy can be prevented from being corroded.

The proportion of the length of the thick portion 9e to the length of the flange 9a in the lateral direction of the sealing plate 2 is preferably larger than the proportion of the length of the thick portion 9e to the length of the flange 9a in the longitudinal direction of the sealing plate 2.

Battery Pack

Figure 8:
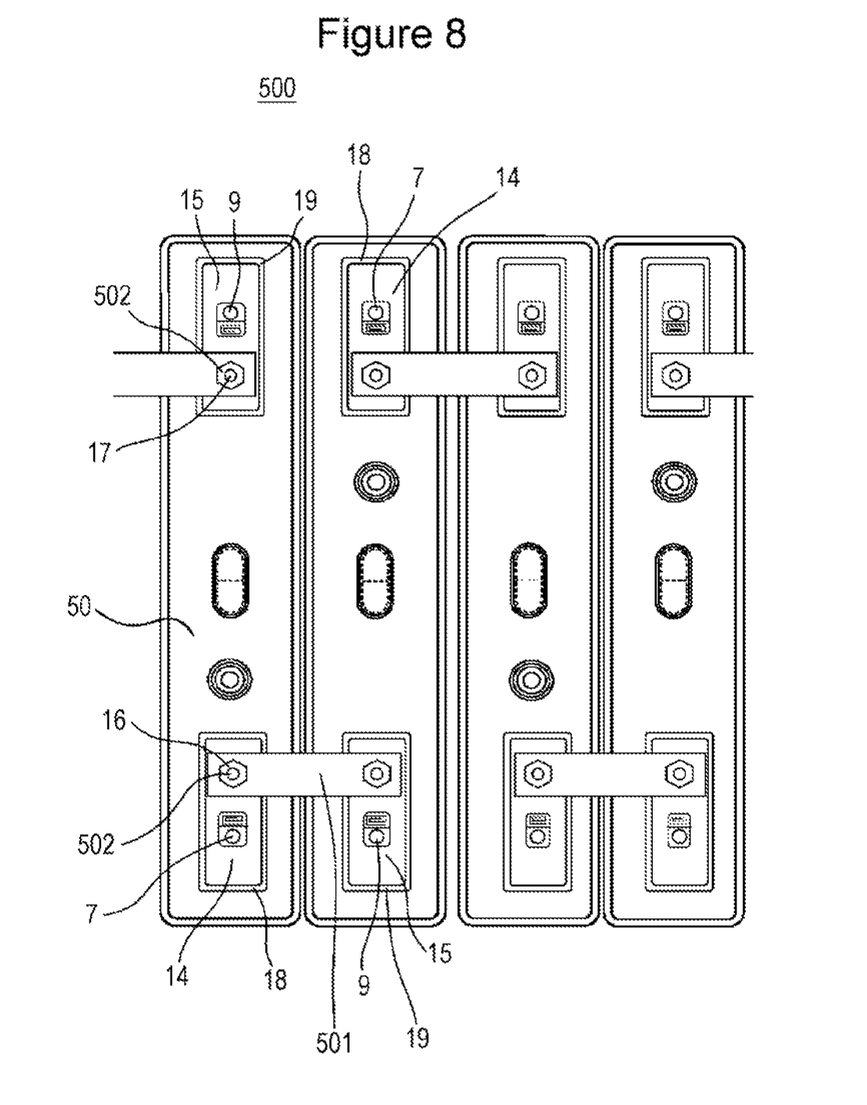
FIG. 8 illustrates a battery pack according to an embodiment.

FIG. 8 is a plan view of a battery pack 500 including multiple secondary cells 50. An external electroconductive member 14 of one secondary cell 50 and an external electroconductive member 15 of another secondary cell 50 are electrically connected to each other by a bus bar 501. The external electroconductive member 14 and the bus bar 501 are connected together by being fastened together with a bolt 16 and a nut 502. The external electroconductive member 15 and the bus bar 501 are connected together by being fastened with a bolt 17 and a nut 502. Preferably, the bus bar 501 is made of metal, or made of aluminium or an aluminium alloy.

Another Battery Pack

The secondary cell 50 and the battery pack 500 according to the above embodiments are described with an example where the external electroconductive member 14 connected to the positive electrode terminal 7 and the external electroconductive member 15 connected to the negative electrode terminal 9 are connected together by the bus bar 501. Alternatively, the positive electrode terminal 7 of one secondary cell 50 and the negative electrode terminal 9 of another secondary cell 50 may be directly connected together by a bus bar.

Figure 9:
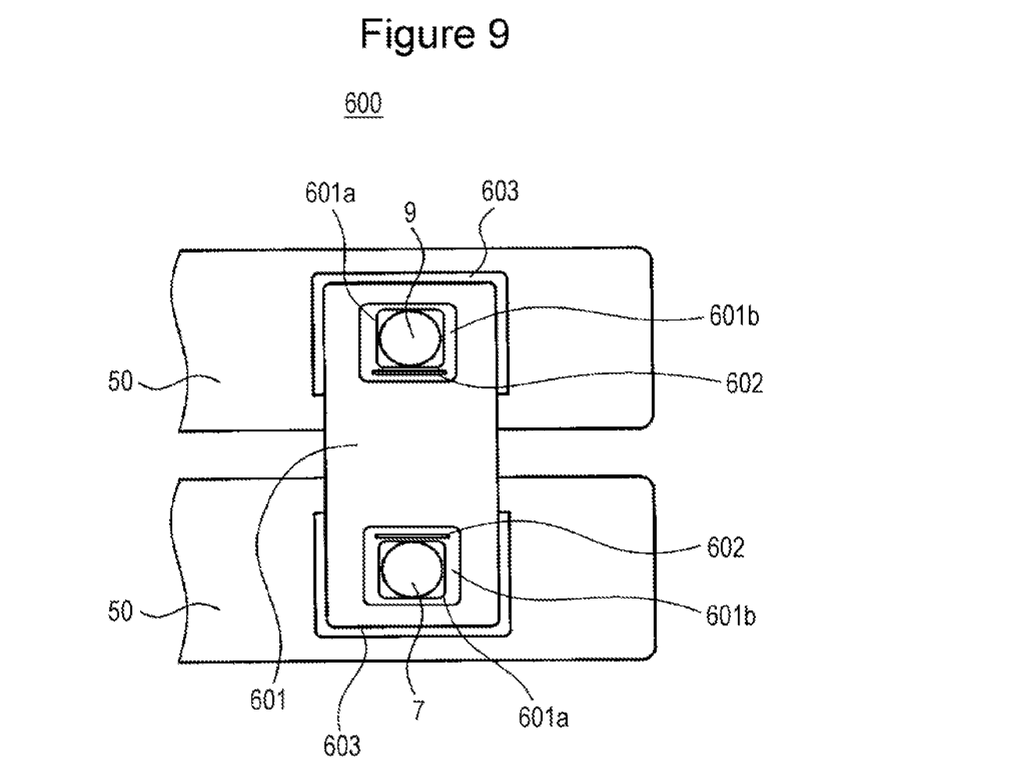
FIG. 9 illustrates a battery pack according to another embodiment.

In a battery pack 600 illustrated in FIG. 9, a bus bar 601 is directly connected to the positive electrode terminal 7 and the negative electrode terminal 9. The bus bar 601 has through-holes 601a. Around each of the through-holes 601a, the bus bar 601 has a thin portion 601b having a smaller thickness than the other portion. The bus bar 601 is welded to the positive electrode terminal 7 and the negative electrode terminal 9 at the thin portions 601b to form welded portions 602. Insulators 603 made of resin are disposed between the bus bar 601 and the sealing plate 2.

Others

In the negative electrode terminal 9, a nickel layer may be disposed between the first area 101 and the second area 102. In this structure, the nickel layer is disposed at the boundary 103.

While detailed embodiments have been used to illustrate the present invention, to those skilled in the art, however, it will be apparent from the foregoing disclosure that various changes and modifications can be made therein without departing from the spirit and scope of the invention. Furthermore, the foregoing description of the embodiments according to the present invention is provided for illustration only, and is not intended to limit the invention.

What is claimed is:

1. A secondary cell, comprising:
an electrode assembly that includes a positive electrode plate and a negative electrode plate;
an outer covering that has an opening and accommodates the electrode assembly;
a sealing plate that covers the opening; and
a terminal electrically connected to the positive electrode plate or the negative electrode plate,
wherein the sealing plate has a terminal attachment hole,
wherein the terminal includes a flange that has a first surface and a second surface opposite to the first surface, and a connection portion on the first surface,
wherein the connection portion is inserted into the terminal attachment hole,
wherein the terminal includes a first area made of aluminium or an aluminium alloy, and a second area made of copper or a copper alloy, wherein the second area is disposed directly adjacent to the first surface of the flange and the first area is disposed directly adjacent to the second surface of the flange, wherein at least part of a boundary between the first area and the second area is disposed between the first surface and the second surface in a thickness direction of the flange, wherein a thinnest portion of the first area of the flange in the thickness direction of the flange has a thickness of larger than or equal to 0.3 mm, wherein an external electroconductive member made of aluminium or an aluminium alloy is disposed on the flange, and wherein the external electroconductive member is welded to the flange to form a welded portion.

2. The secondary cell according to claim 1,
wherein in a portion of the connection portion disposed in the terminal attachment hole, the second area is disposed on an outer side of the first area in a radial direction of the connection portion, and wherein in the portion of the connection portion disposed in the terminal attachment hole, a thinnest portion of the second area in the radial direction of the connection portion has a thickness of larger than or equal to 0.1 mm.

3. The secondary cell according to claim 1,
wherein in the connection portion, the boundary has a shape that protrudes toward the second surface at a center, and wherein a thickest portion of the second area at the center of the boundary having the protruding shape has a thickness of larger than or equal to 0.6 mm.

4. The secondary cell according to claim 1,
wherein a bolt is disposed on the external electroconductive member.

5. The secondary cell according to claim 1,
wherein the external electroconductive member is a bus bar.

6. The secondary cell according to claim 1,
wherein the external electroconductive member includes a thin portion, and wherein the thin portion is welded to the flange to form the welded portion.

7. The secondary cell according to claim 1,
wherein a plurality of the welded portions are formed in a row.

8. A battery pack, comprising:
a plurality of secondary cells each according to claim 1.

* * * * *